United States Patent
Kling, III et al.

(10) Patent No.: US 6,947,867 B2
(45) Date of Patent: Sep. 20, 2005

(54) VEHICLE COLLISION DAMAGE DISPLAY TECHNIQUE

(75) Inventors: Michael J. Kling, III, Delafield, WI (US); David Zinkiewicz, South Milwaukee, WI (US)

(73) Assignee: Snap-on Incorporated, Pleasant Prairie, MN (US)

( * ) Notice: Subject to any disclaimer, the term of this patent is extended or adjusted under 35 U.S.C. 154(b) by 118 days.

(21) Appl. No.: 10/729,436

(22) Filed: Dec. 4, 2003

(65) Prior Publication Data

US 2005/0125193 A1 Jun. 9, 2005

(51) Int. Cl.[7] ............ G01C 17/00; G09G 5/00; B60Q 1/00; G01D 21/00
(52) U.S. Cl. ............ 702/150; 345/419; 345/473; 345/619; 340/435; 340/479; 340/903; 33/608; 33/288; 33/645
(58) Field of Search ............ 702/150–153, 702/94–95; 345/419, 435, 619; 340/435, 479, 903; 33/608

(56) References Cited

U.S. PATENT DOCUMENTS

| | | |
|---|---|---|
| 4,445,185 A | 4/1984 | Davis, Jr. et al. |
| 4,868,761 A | 9/1989 | Hayashi |
| 4,918,627 A | 4/1990 | Garcia et al. |
| 5,341,575 A | 8/1994 | Chisum |
| 5,487,021 A | 1/1996 | Fujita et al. |
| 5,530,652 A | 6/1996 | Croyle et al. |
| 5,717,595 A | 2/1998 | Cherrington et al. |
| 5,790,400 A | 8/1998 | Higuchi |
| 5,839,112 A | 11/1998 | Schreitmueller et al. |
| 6,052,631 A | 4/2000 | Busch et al. |
| 6,115,927 A | 9/2000 | Hendrix |
| 6,166,744 A | 12/2000 | Jaszlics et al. |
| 6,185,540 B1 | 2/2001 | Schreitmueller et al. |
| 6,397,131 B1 | 5/2002 | Busch et al. |
| 6,476,344 B1 * | 11/2002 | Fields et al. ............ 219/121.63 |

* cited by examiner

*Primary Examiner*—John Barlow
*Assistant Examiner*—Sujoy K. Kundu
(74) *Attorney, Agent, or Firm*—Seyfarth Shaw LLP

(57) ABSTRACT

A system for graphic display of point-to-point distance measurements in an object measuring system includes display of a graphic drawing representing the object and depictions of measured points representing their locations on the object and displays of lines between the points of selected pairs of displayed points to indicate where a distance measurement is taken. For each line there is displayed an indication that the measured distance is (a) within tolerance limits of a standard distance, (b) shorter than the standard distance by a difference greater than a lower tolerance limit or (c) greater than the standard distance by a difference exceeding an upper tolerance limit. There may simultaneously be displayed an alphanumeric table indicating the points, the measured and standard distances and the differences, which table may utilize the same tolerance indication scheme as the graphical representation.

13 Claims, 4 Drawing Sheets

VEHICLE COLLISION DAMAGE DISPLAY TECHNIQUE

BACKGROUND

This application relates to measuring systems for objects and, in particular, to systems designed for making dimensional measurements on automotive vehicles for the purpose of collision damage repair. However, it will be appreciated that the principles described herein could have application to measurement of any type of object.

Various types of measuring devices have been utilized on vehicles, e.g., to attempt to determine how much a vehicle frame or body deviates from standard specifications in order to determine the amount of repair or straightening that may be needed. Such systems include ultrasonic measuring systems, optical systems, systems using mechanical sensors and systems using a bar with movable pointers thereon. The systems may "measure" the distance between points by determining the three-dimensional coordinates of points and then calculating the distance between the points, or by directly measuring the distance between selected points, and may then compare such measured distances with standard distances for these pairs of points. Typically, the measured distances, the standard distances and differences therebetween are presented to the user in an alphanumeric fashion which may be difficult and time-consuming for the operator to read and interpret.

SUMMARY

There is disclosed herein an improved measurement system which avoids disadvantages of prior systems while affording additional structural and operating advantages.

The system provides to an operator information about measured distances and differences between such measured distances and standard distances in a readily understood fashion.

There is disclosed a display system for a measuring system which determines the positions in space of predetermined points on an object and measures distances between points of selected pairs of such points, the display system comprising a storage device storing a library of information relating to objects to be measured including standard distances between points of predetermined pairs of points on such objects and/or coordinates of points which can be used to calculate such standard distances, a display device, and a processor operating under stored program control and coupled to the storage device and to the display device and comparing measured distances between points of selected pairs of points on an object with corresponding standard distances, the program including a routine for causing display of a graphical representation of the object being measured and predetermined points thereon and, for each selected pair of such points, a line between the points, the routine causing a display for each such line of an indication as to whether or not the measured distance represented by the line is within predetermined tolerance limits for the corresponding standard distance.

There is also a disclosed method of displaying data in a measuring system which determines the positions in space of predetermined points on an object and measures distances between points of selected pairs of such points, the method comprising storing a library of information relating to objects to be measured including standard distances between points of predetermined pairs of points on such objects and/or coordinates of points which can be used to calculate such standard distances, comparing measured distances between pairs of points on the object with corresponding standard distances from the library, displaying on a display screen a graphical representation of the object being measured and predetermined points thereon, for each of selected pairs of displayed points displaying a line between the points of the pair, and displaying in association with each such line an indication as to whether or not the measured distance represented by the line is within predetermined tolerance limits for the corresponding standard distance.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
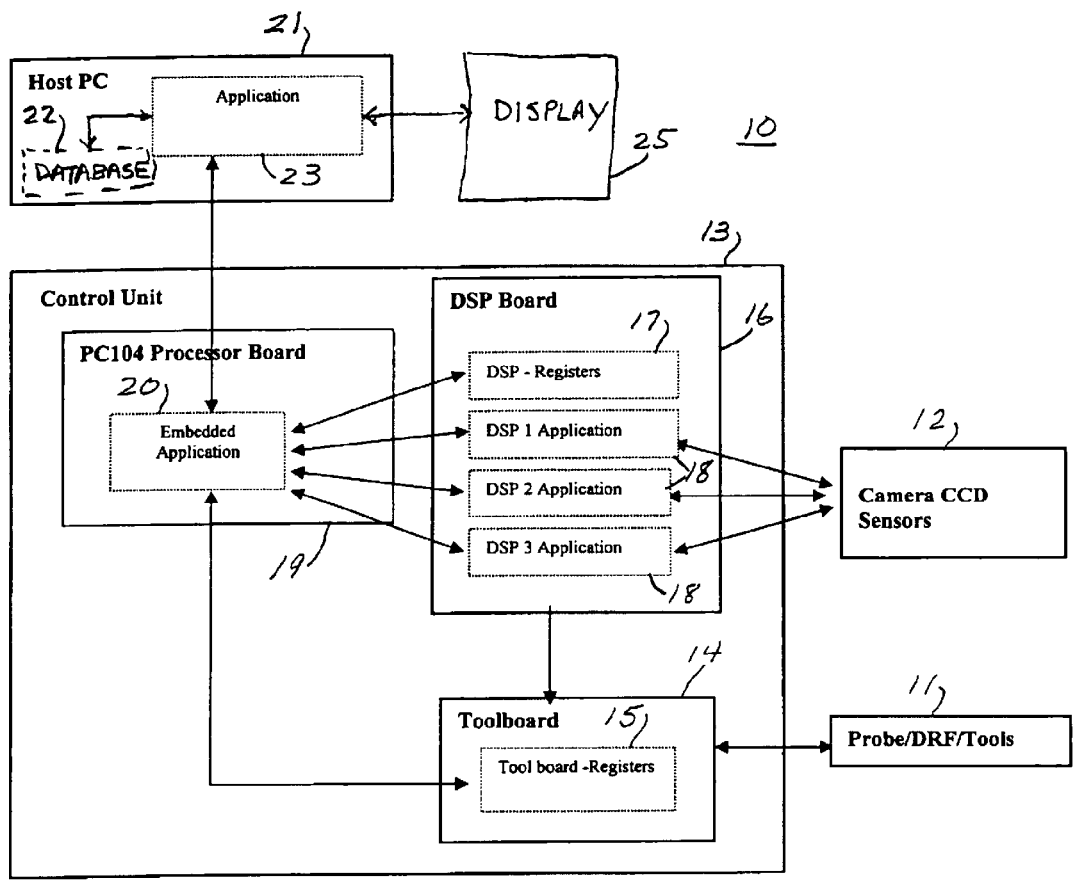
FIG. 1 is a functional blocked diagrammatic view of an embodiment of a measurement system.

Referring to FIG. 1, there is illustrated a measurement system, generally designated by the numeral 10, the hardware portions of which may be similar to those in U.S. Pat. No. 6,115,927. The system 10 may include probe and dynamic reference frame (DRF) tools 11 including a hand-held probe including optical emitters and a digital reference frame which also carriers optical emitters, these emitters all being sensed or viewed by an array of camera sensors 12, which may include three camera modules or sensors fixed relative to one another. In use, the emitters on the dynamic reference frame are fixed relative to one another and the dynamic reference frame is, in turn, fixed relative to the automobile body or other object being measured. The handheld probe emitters are also fixed relative to one another and the camera sensors 12 are fixed relative to one another. The system 10 also includes a control unit 13 which includes a tool board 14 and tool board registers 15 to which the probe/DRF tools 11 are coupled. The control unit 13 also includes a digital signal processing (DSP) board 16 which includes DSP registers 17 and 3 DSP applications 18 respectively coupled to the camera sensors 12. The control unit 13 also includes a processor board 19 which runs an embedded software application 20 which is coupled to the tool board registers 15, the DSP registers 17 and the DSP applications 18. The embedded application 20 senses the probe/DRF emitters and the camera sensors 12 and calculates, by triangulation, the three-dimensional coordinates of points on the object being measured which are engaged by the handheld probe.

The system 10 also includes a host computer 21 which includes a database 22 and host application software 23. The database 22 stores standard or reference information regarding a number of different known vehicle bodies, including the standard distances between points of selected pairs of such points and/or coordinates of points which can be used to calculate such standard distances. The application software 23 is coupled to the database 22 and to a display device 25, such as a CRT display.

Figure 2:
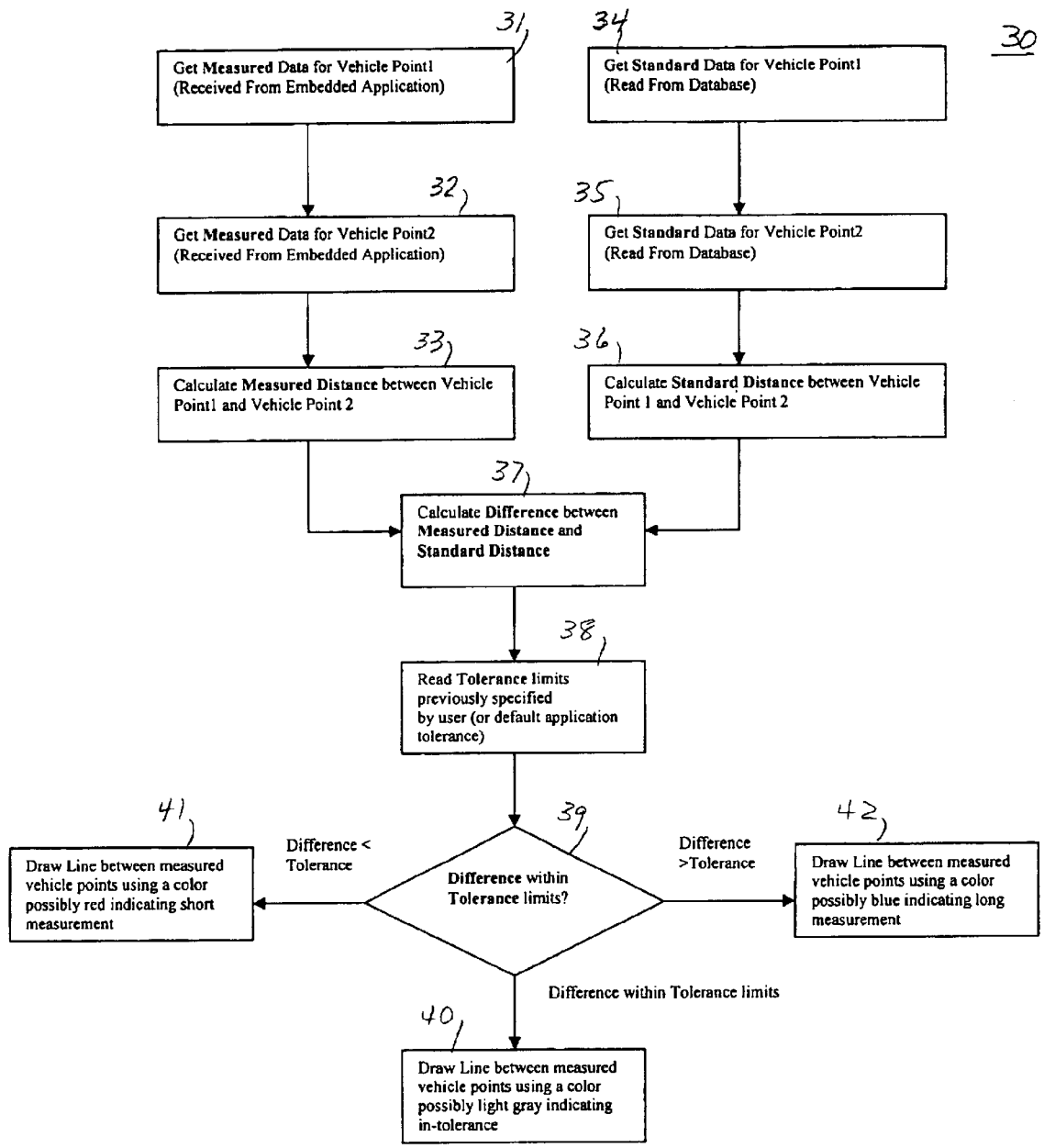
FIG. 2 is a flowchart diagram illustrating the software routine of the system of FIG. 1 for calculating and displaying measured distance data and the difference between such data and standard measurement values.
Figure 3:
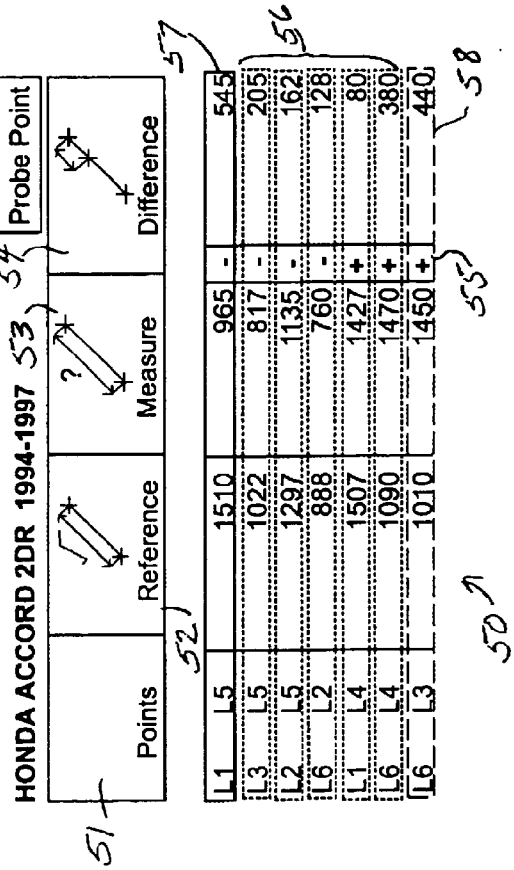
FIG. 3 is a screen print of a display screen in accordance with the embodiment of FIGS. 1 and 2.
Figure 3:
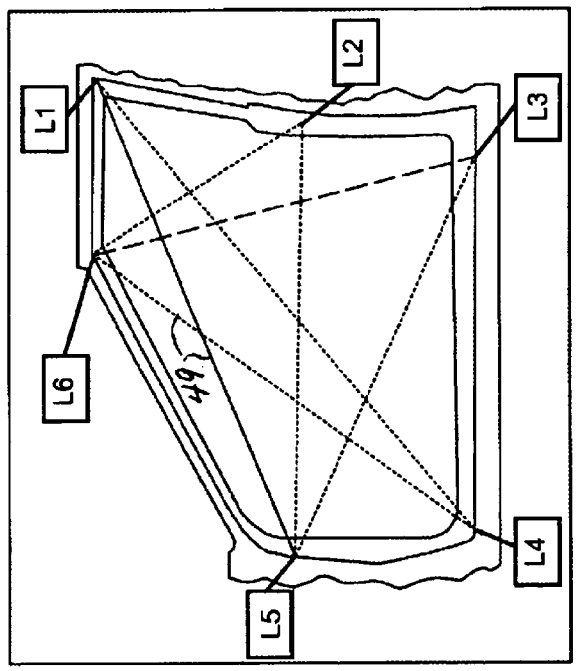

Referring now to FIGS. 2 and 3, the operation of the system 10 will be described. FIG. 2 illustrates, in flowchart form, the program software routine 30 which is run by the application program 23 in the host computer 21 for controlling the display device 25 to generate and display a screen display of the type illustrated in FIG. 3. Initially, the user will select a predetermined vehicle with respect to which points and distances are to be measured, whereupon the host application 23 will cause to be displayed on the display device 25 a graphical representation of the object being measured and the locations thereon of suggested points to be measured. The user may then, utilizing the hand-held probe and the embedded application 20 and host application 23, measure the locations on the vehicle of points corresponding to the displayed points or other points selected by the user, whereupon the embedded application will determine the coordinates for each such point. First, at 31, the host application software routine obtains from the embedded application 20 in the control unit 13 measured data for a first vehicle point and then, at 32, obtains the measured data for a second vehicle point and then, at 33 calculates the measured distance between the first and second vehicle points. The routine also, at 34, obtains from the database 22 the standard data for the first vehicle point, at 35 obtains the standard data for the second vehicle point and, at 36, calculates the standard distance between the standard first and second vehicle points. Then, at 37, the routine calculates the difference between the measured distance between the first and second points and the standard distance between those points and then, at 38 reads stored tolerance limits, which are either previously specified by the user or are default application tolerances. Then, at 39, the routine checks to see if the calculated difference from 37 is within the tolerance limits from 38. These tolerance limits may include an upper limit and a lower limit. If the difference between measured and standard distances is within the tolerance limits for that distance, the routine then, at 40, draws a line 49 between the measured vehicle points utilizing a predetermined color (e.g. light gray, designated by solid lines,) which immediately visually informs the user of a location of the distance measured and also immediately indicates visually that the difference between the measured and standard distances for that set of points is within tolerance limits. If, at 39, the measured distance is less than the standard distance by a difference greater than the lower tolerance limit, the routine then, at 41, draws a line between the measured vehicle points using a second color (possibly red, designated in small dashed lines), indicating the location of the distance being measured and immediately visually indicating that the measured distance is less than the standard distance by greater than the lower tolerance limit. If, at 39, the measured distance is greater than the standard distance by a difference greater than the upper tolerance limit, the routine then at 42 draws a line between the measured vehicle points using a third color (possibly blue, designated by long dashed lines), providing an immediate graphical indication of the location of the distance being measured and the fact that the measured distance is greater than the reference or standard distance by an amount which exceeds the upper tolerance limit.

The system 10 will proceed through the software routine 30 for each pair of points, the distance between which is to be measured. Referring to FIG. 3, there will be displayed on the display device 25 a screen display 45, which includes a selector icon 46, activation of which (by touch screen or clicking on a mouse cursor or the like) will permit the operator to select the identifying data for the vehicle to be measured. There will then be displayed on the display device 25 a graphical background diagram 47 of the vehicle or portion thereof being measured, including the locations of predetermined points thereon (six of which are, respectively, designated L1–L6.) As the software routine 30 operates on selected pairs of these points, lines 49 which are drawn between the points of the pair in colors corresponding to whether the measured distance differs from the standard distance by an amount which (a) is within tolerance limits, or (b) which is less than the lower tolerance limit or (c) which is greater than the upper tolerance limit.

The screen display 45 simultaneously displays the results of the measurement in a table 50, which has column headings 51, 52, 53 and 54 which, respectively, indicate the designation of the points, the distance between which is being measured, the reference or standard distance between those points, the measured distance between those points, and the difference between the reference and measured distances between columns 52 and 53. A column 55 indicating by a plus sign or a minus sign whether the measured distance is less than or greater than the standard distance. The data displayed in the table 50 utilizes the same color scheme as in the graphical display 47, the rows for the differences which are within tolerance limits being depicted in a first color, the rows for distance differences which are less than the lower tolerance limit being illustrated in the second color, and the rows for distance differences which are greater than the upper tolerance limits being illustrated in the third color.

Figure 4:
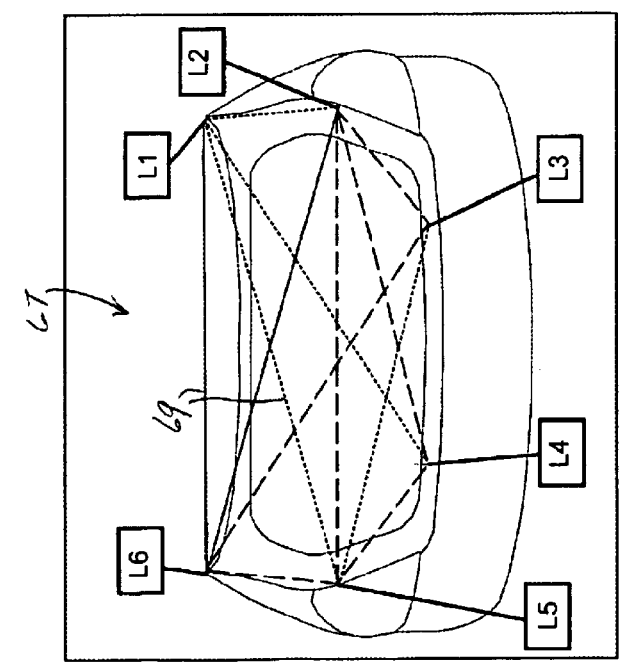
FIG. 4 is a screen print of another display screen in accordance with the embodiment of FIGS. 1 and 2.
Figure 4:
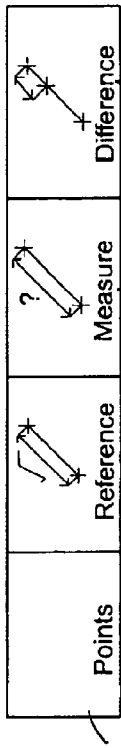

FIG. 4 illustrates another screen display 65 which relates to measured distances between points on another portion of the vehicle, such as the trunk area. The background display 67 includes an illustration of points (designated L1–L6), distances between which are to be measured and, as the distances are measured, draws lines 69 in appropriate colors to indicate whether the difference between the measured and standard distances are within or without tolerance limits, as explained above. The display 65 also includes a table 70 with column heading 71–75 respectively corresponding to columns 51–55, described above, the tabulated data being depicted utilizing the same color scheme as is used on the graphical display 67.

While specific colors are referred to in the foregoing description, it will be appreciated that any desired colors could be utilized and graphical representations other than color could be used. For example, lines could be displayed in different weights or thicknesses, in different constructions, such as solid, dashed, etc., or blinking at different rates. Also, the specific number of measured points shown in the drawings is simply by way of illustration, and the display could include any number of pairs of points.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A display system for a measuring system which determines the positions in space of predetermined points on an object and measures distances between points of selected pairs of such points, the display system comprising:

a storage device storing a library of information relating to objects to be measured including standard distances between points of predetermined pairs of points on such objects and/or coordinates of points which can be used to calculate such standard distances, a display device, and a processor operating under stored program control and coupled to the storage device and to the display device and comparing measured distances between points of selected pairs of points on an object with corresponding standard distances, the program including a display routine for causing display of a graphical representation of the object being measured and predetermined points thereon and, for each selected pair of such points, a line between the points, the routine causing a display for each such line of an indication as to whether or not the measured distance represented by the line is within predetermined tolerance limits for the corresponding standard distance.

2. The system of claim 1, wherein the display is a color display and the display routine includes a subroutine for changing the color of the displayed line depending upon whether or not the measured distance represented thereby is within predetermined tolerance limits.

3. The apparatus of claim 2, wherein the subroutine includes displaying the line in a first color if the measured distance is within tolerance limits, and in a second color if the measured distances are shorter than the corresponding standard distance by more than the tolerance limits, and in a third color if the measured distance is greater than the corresponding standard distance by more than the tolerance limits.

4. The system of claim 1, wherein the display routine includes a subroutine for displaying simultaneously with the graphical representation an alphanumeric table listing displayed pairs of points, standard and measured distances between the points of such pairs and the differences between measured and standard distances.

5. The system of claim 4, wherein the display is a color display, and the subroutine displays the table information in accordance with a color code utilizing a first color for differences within tolerance limits, a second color for differences which are less than a lower tolerance limit and a third color for differences which are higher than an upper tolerance limit.

6. The system of claim 1, wherein the object being measured is a vehicle body.

7. A method of displaying data in a measuring system which determines the positions in space of predetermined points on an object and measures distances between points of selected pairs of such points, the method comprising:

storing a library of information relating to objects to be measured including standard distances between points of predetermined pairs of points on such objects and/or coordinates of points which can be used to calculate such standard distances, comparing measured distances between points of pairs of points on the object with corresponding standard distances from the library, displaying on a display screen a graphical representation of the object being measured and predetermined points thereon, for each of selected pairs of displayed points displaying a line between the points of the pair, and displaying in association with each such line an indication as to whether or not the measured distance represented by the line is within predetermined tolerance limits for the corresponding standard distance.

8. The method of claim 7, wherein the display is a color display, and the displaying of an indication of whether or not a measured distance is within tolerance limits for the corresponding standard distance includes changing the color of the displayed line depending upon whether or not the measured distances represented thereby is within predetermined tolerance.

9. The method of claim 8, wherein changing the color of the displayed line includes displaying the line in a first color if the measured distance is within tolerance limits, and in a second color if the measured distance is shorter than the corresponding standard distance by more than the tolerance limits, and in a third color if the measured distance is greater than the corresponding standard distance by more than the tolerance limits.

10. The method of claim 7, and further comprising displaying simultaneously with the graphical representation an alphanumeric table listing displayed pairs of points, standard and measured distances between the points of such pairs and the differences between measured and standard distances.

11. The method of claim 10, wherein the display is a color display and the alphanumeric table includes displaying the table information in accordance with a color code utilizing a first color for differences within tolerance limits, a second color for differences which are less than a lower tolerance limit and a third color for differences which are higher than an upper tolerance limit.

12. The method of claim 7, wherein the object being measured is a vehicle body.

13. A display system for a measuring system which determines the positions in space of predetermined points on an object and measures distances between points of selected pairs of such points, the display system comprising:

storage means storing a library of information relating to objects to be measured including standard distances between points of predetermined pairs of points on such objects and/or coordinates of points which can be used to calculate such standard distances, a display means, and processor means operating under stored program control and coupled to the storage means and to the display means and comparing measured distances between points of selected pairs of points on an object with corresponding standard distances, the program including a routine for causing display of a graphical representation of the object being measured and predetermined points thereon and, for each selected pair of such points, a line between the points, the routine causing a display for each such line of an indication as to whether or not the measured distance represented by the line is within predetermined tolerance limits for the corresponding standard distance.

* * * * *